(No Model.)
R. A. CHESEBROUGH.
APPARATUS FOR CONTINUOUS DISTILLATION.
No. 524,704.  Patented Aug. 21, 1894.
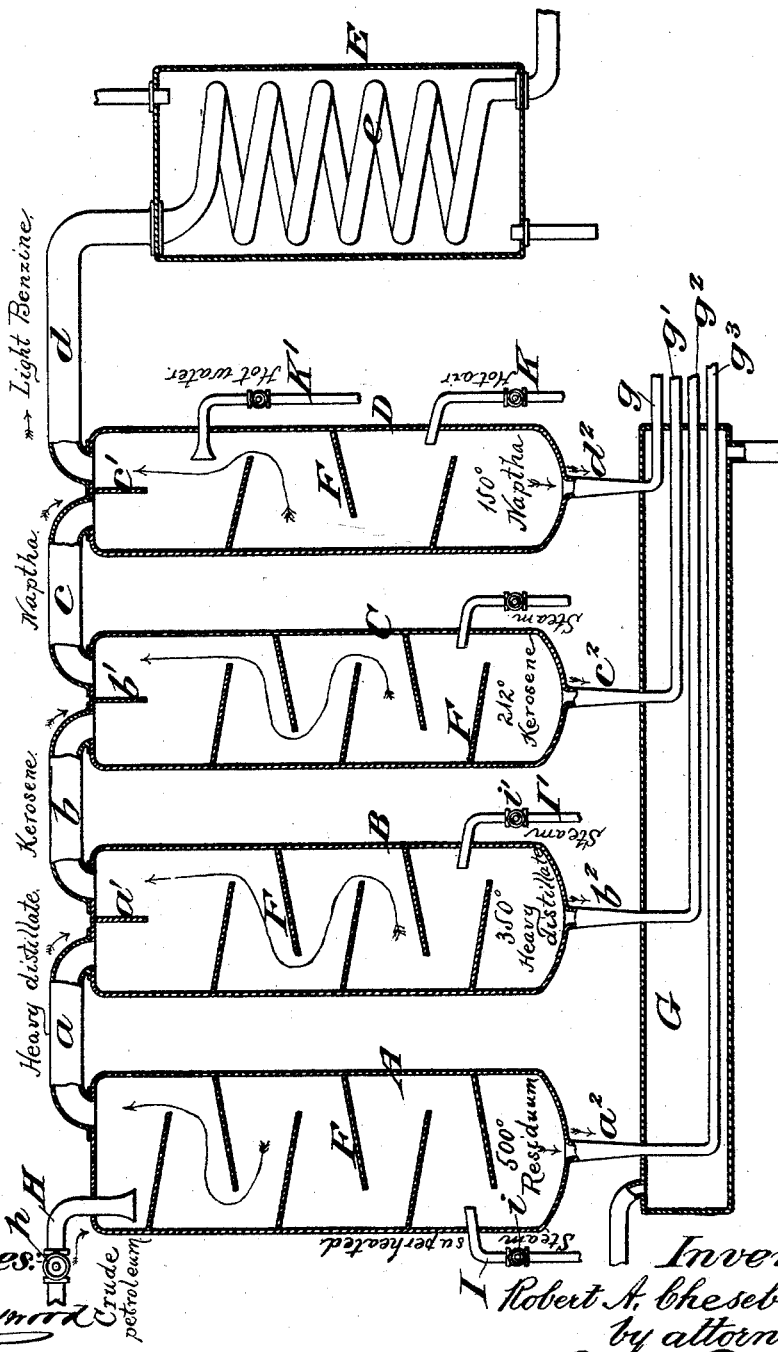

UNITED STATES PATENT OFFICE.

ROBERT A. CHESEBROUGH, OF NEW YORK, N. Y.

APPARATUS FOR CONTINUOUS DISTILLATION.

SPECIFICATION forming part of Letters Patent No. 524,704, dated August 21, 1894.

Application filed October 17, 1891. Serial No. 409,033. (No model.)

*To all whom it may concern:*

Be it known that I, ROBERT A. CHESEBROUGH, of New York, in the county and State of New York, have invented a new and useful Improvement in Apparatus for Continuous Distillation, of which the following is a specification.

My invention relates to an improvement in apparatus for continuous distillation for obtaining the residuum and various distillates of petroleum, with a view to providing simple and economical means for subjecting the crude oil and its distillates, with great precision, to a predeterminal degree of heat throughout their passage through the still and thereby obtaining a residuum and one or more distillates of uniform quality.

A practical embodiment of my invention is represented in the accompanying drawing which represents a series of four stills, a condenser, and the inlet, outlet and connecting pipes employed in connection therewith.

The stills are represented by A B C and D and may be formed gradually diminishing in size as shown or they might be made of the same size. They are connected at their upper ends by pipes $a$ $b$ and $c$ and a pipe $d$ leads from the upper end of the last still to a worm $e$ within a condenser E.

Baffle plates $a'$ $b'$ and $c'$ depend into the upper ends of the stills B C and D to prevent the passage of the vapor across the top of the still and to direct it downwardly into contact with the distributing plates within the stills.

Each still is provided with series of distributing plates F which extend downwardly and inwardly alternately from opposite sides of the still, and have their inner ends arranged to overlap, so that the oil is caused to flow from one to another along down the series and thus becomes wholly exposed to the temperature within the still. The plates F may be either perforated or not as found most expedient.

From the bottoms of the stills outlet pipes $a^2$ $b^2$ $c^2$ and $d^2$ lead to their respective discharge pipes $g$ $g'$ $g^2$ $g^3$ located conveniently in a common cooling trough G.

The crude oil is admitted into the top of the first still by a pipe H provided with a stop cock $h$.

The temperature within the first still is maintained at the proper degree, (500° for example,) by a supply of super heated steam admitted into the lower portion of the still through a pipe I provided with a stop cock $i$. The succeeding still B, has a steam pipe I' provided with a stop cock $i'$ in communication with its lower portion by means of which the temperature of that still is maintained at the desired lower temperature, (350° for example,) in case the steam passing over from the first still fails to keep the still B at the desired temperature. The succeeding still C is in like manner provided with a steam supply at a still lower temperature for maintaining the temperature in that still at the desired degree, (212° for example,) and the last still D is provided either with a hot air supply K at the bottom or with a hot water supply K' at the top or with both, to keep the temperature of this still at the desired degree (150° for example) for the separation of the lighter products from the distillate therein.

While I have represented a group of four connected stills, it may be found desirable to increase or decrease the members above or below that number.

The degrees of temperature which I have suggested are those at which the products known as residuum, heavy distillate, kerosene and naphtha will fail to pass off, the product which passes off from the still D at 150° temperature being light benzine. In operation the still A having been raised to the desired temperature by the superheated steam, the oil is admitted, and after passing down the plates and being thoroughly exposed to the temperature, the residuum passes off through the outlet pipe $a^2$ into the discharge pipe G. The products which have become vaporized at the temperature of the first still pass on into the second still when, either by the cooling of the superheated steam and vapors from the first still, or by the combined effect of such cooling and the admission of cooler steam through the pipe I', a certain portion passes off in liquid form from the bottom of the still and may be collected as heavy distillate. In like manner the vaporized products are further separated in stills C and D.

What I claim is—

A still comprising several members in communication with each other at the top, each member being provided with oil retarding plates and the member next succeeding a previous member being provided with a depending baffle plate at its top intermediate of the inlet and outlet passages, an oil supply pipe and a superheated steam supply pipe in communication with the first member, means for maintaining a reduced degree of temperature in succeeding members, suitable discharge pipes leading independently from the bottoms of the several members, a condenser and a pipe leading from the final member into the condenser, substantially as set forth.

ROBERT A. CHESEBROUGH.

Witnesses:
FREDK. HAYNES,
C. E. LUNDGREN.